United States Patent
Li

(10) Patent No.: US 12,265,720 B2
(45) Date of Patent: Apr. 1, 2025

(54) METHOD AND SYSTEM OF LARGE AMOUNT OF DATA MIGRATION WITH ENHANCED EFFICIENCY

(71) Applicant: ALIBABA GROUP HOLDING LIMITED, Grand Cayman (KY)

(72) Inventor: Shu Li, Santa Clara, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 36 days.

(21) Appl. No.: 17/007,899

(22) Filed: Aug. 31, 2020

(65) Prior Publication Data

US 2022/0066674 A1    Mar. 3, 2022

(51) Int. Cl.
*G06F 3/06* (2006.01)

(52) U.S. Cl.
CPC .......... *G06F 3/0647* (2013.01); *G06F 3/0604* (2013.01); *G06F 3/0619* (2013.01); *G06F 3/064* (2013.01); *G06F 3/0679* (2013.01)

(58) Field of Classification Search
USPC .................................................. 711/154, 161
See application file for complete search history.

(56) References Cited

U.S. PATENT DOCUMENTS

| | | | | |
|---|---|---|---|---|
| 7,761,449 B2* | 7/2010 | Wilkes | ................... | G06F 3/0601 707/657 |
| 8,281,089 B2* | 10/2012 | Suzuki | ................ | G06F 11/2066 714/2 |
| 8,650,157 B1* | 2/2014 | Jha | ....................... | G06F 11/1456 707/661 |
| 10,884,875 B2* | 1/2021 | Petracca | ............. | G06F 11/1451 |
| 2007/0113276 A1* | 5/2007 | Shoji | ....................... | G06F 21/34 726/17 |
| 2008/0162797 A1* | 7/2008 | Teicher | ............... | G06F 11/2087 711/115 |
| 2009/0094415 A1* | 4/2009 | Sugar | ..................... | G06F 3/0632 711/114 |
| 2009/0161437 A1* | 6/2009 | Pyeon | ..................... | G11C 16/12 365/185.17 |
| 2010/0257140 A1* | 10/2010 | Davis | ..................... | G06F 16/113 707/661 |
| 2011/0041005 A1* | 2/2011 | Selinger | ............... | G11C 29/765 714/48 |

(Continued)

FOREIGN PATENT DOCUMENTS

KR    20120090320 A  *  8/2012 .......... G06F 11/1076

*Primary Examiner* — Yaima Rigol
*Assistant Examiner* — Elias Young Kim
(74) *Attorney, Agent, or Firm* — Finnegan, Henderson, Farabow, Garrett & Dunner, LLP

(57) ABSTRACT

The present disclosure provides methods, systems, and non-transitory computer readable media for migrating data in a data storage system. A method for migrating data comprises: transferring data from a storage cluster in a first data center to a migration cartridge of the first data center; converting, by the migration cartridge of the first data center, the data's format into an archival format; storing the data into a media card; and moving the media card from the first data center to a second data center, wherein the data is read from the media card into a migration cartridge of the second data center and stored into an archival cluster in the second data center according to the archival format of the data.

17 Claims, 8 Drawing Sheets

(56) References Cited

U.S. PATENT DOCUMENTS

| | | | |
|---|---|---|---|
| 2011/0167234 A1* | 7/2011 | Nishibori | G06F 11/1456 |
| | | | 711/E12.001 |
| 2012/0036318 A1* | 2/2012 | Cideciyan | G06F 3/0619 |
| | | | 711/111 |
| 2013/0132663 A1* | 5/2013 | Eleftheriou | G06F 3/061 |
| | | | 711/111 |
| 2014/0046904 A1* | 2/2014 | Kumarasamy | G06F 3/067 |
| | | | 707/652 |
| 2014/0068182 A1* | 3/2014 | Terry | G06F 3/0689 |
| | | | 711/114 |
| 2016/0246517 A1* | 8/2016 | Venkatesan | G06F 3/0619 |
| 2017/0013046 A1* | 1/2017 | Flynn | H04L 67/01 |
| 2018/0302473 A1* | 10/2018 | Goker | G06F 16/1827 |
| 2019/0220349 A1* | 7/2019 | Deutsch | G06F 11/1064 |
| 2019/0332267 A1* | 10/2019 | Muniswamy-Reddy | |
| | | | G06F 11/1471 |
| 2020/0019532 A1* | 1/2020 | Kashi Visvanathan | |
| | | | G06F 16/2365 |
| 2020/0042229 A1* | 2/2020 | Miyamura | G06F 3/0682 |
| 2020/0241962 A1* | 7/2020 | Dain | G06F 16/1748 |
| 2021/0389898 A1* | 12/2021 | Hironaka | G06F 3/0685 |

\* cited by examiner

METHOD AND SYSTEM OF LARGE AMOUNT OF DATA MIGRATION WITH ENHANCED EFFICIENCY

TECHNICAL FIELD

The present disclosure generally relates to data storage, and more particularly, to methods, systems, and non-transitory computer readable media for optimizing data migration of a data storage system.

BACKGROUND

Modern-day data centers can have storage clusters that possess a huge amount of data. Due to the sheer size of the data stored in storage clusters, data migration can last for months, and consumes tremendous network bandwidth. In addition, while data migration is taking place, the original copy of the data still needs to be maintained until the migration process finishes. The overall cost of data migration is high due to the long overlapping period to hold two copies of the data in source and destination clusters. Additionally, the data migration is also frequently interrupted by the network condition, further adding to the cost of performing the migration process.

SUMMARY OF THE DISCLOSURE

Embodiments of the present disclosure provide method for migrating data, the method comprising: transferring data from a storage cluster in a first data center to a migration cartridge of the first data center; converting, by the migration cartridge of the first data center, the data's format into an archival format; storing the data into a media card; and moving the media card from the first data center to a second data center, wherein the data is read from the media card into a migration cartridge of the second data center and stored into an archival cluster in the second data center according to the archival format of the data.

Embodiments of the present disclosure further provide a non-transitory computer readable medium that stores a set of instructions that is executable by at least one processor of a computer system to cause the computer system to perform a method, the method comprising transferring data from a storage cluster in a first data center to a migration cartridge of the first data center; converting, by the migration cartridge of the first data center, the data's format into an archival format; storing the data into a media card; and moving the media card from the first data center to a second data center, wherein the data is read from the media card into a migration cartridge of the second data center and stored into an archival cluster in the second data center according to the archival format of the data.

Embodiments of the present disclosure further provides a system for data migration, comprising: a first data center; a storage cluster in the first data center; a migration cartridge in the first data center; a memory storing a set of instructions; and one or more processors configured to execute the set of instructions to cause the system to perform: transferring data from a storage cluster in a first data center to a migration cartridge of the first data center; converting, by the migration cartridge of the first data center, the data's format into an archival format; storing the data into a media card; and moving the media card from the first data center to a second data center, wherein the data is read from the media card into a migration cartridge of the second data center and stored into an archival cluster in the second data center according to the archival format of the data.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
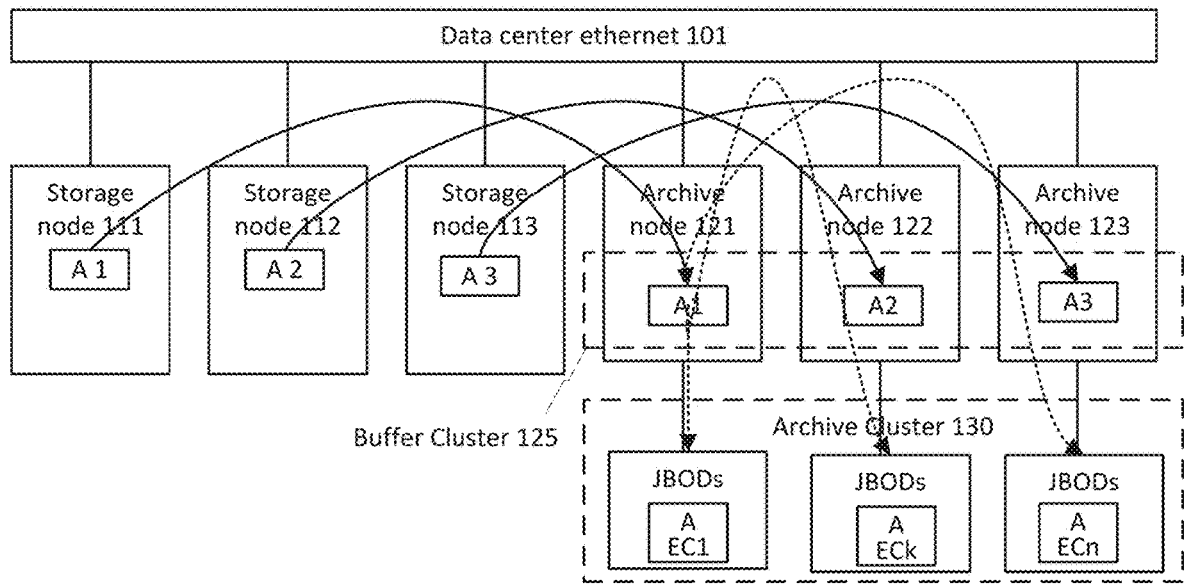
FIG. 1 is an illustration of an example data migration process via a data center network.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

In modern day data storage systems, the storage unit can be hard disk drives ("HDDs"). HDDs are electromechanical devices, which store data by manipulating the magnetic field of small portions of a rapidly rotating disk composed of ferromagnetic material. But HDDs have several limitations that make them less favored in modern day systems. In particular, the transfer speeds of HDDs are largely stagnated. The transfer speed of an HDD is largely determined by the speed of the rotating disk, which begins to face physical limitations above a certain number of rotations per second (e.g., the rotating disk experiences mechanical failure and fragments). Having largely reached the current limits of angular velocity sustainable by the rotating disk, HDD speeds have mostly plateaued. However, CPU's processing speed did not face a similar limitation. As the amount of data accessed continued to increase, HDD speeds increasingly became a bottleneck on system performance. This led to the search for and eventually introduction of a new memory storage technology.

To compensate for the shortcomings of HDDs, an alternative storage technology ultimate chosen was flash memory. Flash storage is composed of circuitry, principally logic gates composed of transistors. Since flash storage stores data via circuitry, flash storage is a solid-state storage technology, a category for storage technology that does not have (mechanically) moving components. A solid-state based device has advantages over electromechanical devices such as HDDs, because solid-state devices does not face the physical limitations or increased chances of failure typically imposed by using mechanical movements. Flash storage is faster, more reliable, and more resistant to physical shock. As its cost-per-gigabyte has fallen, flash storage has become increasingly prevalent, being the underlying technology of flash drives, SD cards, the non-volatile storage unit of smartphones and tablets, among others. And in the last decade, flash storage has become increasingly prominent in PCs and servers in the form of solid-state drives ("SSDs").

SSDs are, in common usage, secondary storage units based on flash technology. Technically referring to any secondary storage unit that does not involve mechanically moving components like HDDs, SSDs are made using flash technology. As such, SSDs do not face the mechanical limitations encountered by HDDs. SSDs have many of the same advantages over HDDs as flash storage such as having significantly higher speeds and much lower latencies. However, SSDs have several special characteristics that can lead to a degradation in system performance if not properly managed. In particular, SSD's must perform a process known as garbage collection before the SSD can overwrite any previously written data. The process of garbage collection can be resource intensive, degrading an SSD's performance. Moreover, the cost of SSDs is generally more expensive, and the maintenance cost for operating SSDs is more expensive as well. Therefore, for a database storage system, it is important to operate on both HDDs and SSDs to separate different types of data to store in either HDDs and SSDs.

In modern day data storage systems, data hotness is a general way to determine if data is updated or accessed frequently or not. In many of the existing systems, data that are accessed frequently can usually be stored in data storages that provide quicker access speed (e.g., SSDs), and data that are accessed or updated infrequently can be archived in data storages that are cheap to maintain and operate, but provide a slower access speed. As a result, there is a need to periodically migrate and archive at least a portion of the data into archive nodes. This archiving operation allows the data storage system to preserve more valuable data storages (e.g., SSDs) for hot data.

To perform data migrations between data clusters for archiving purposes, some existing systems connect archival systems with storage clusters through a data center network, which comprises an internet connection. This design is especially prevalent for data centers that are not physically located close to each other, and an internet connection is a primary connection for data transfer between the data centers. FIG. 1 is an illustration of an example data migration process via a data center network. As shown in FIG. 1, storage nodes 111-113 and archive nodes 121-123 can be communicatively coupled via data center ethernet 101. When data migration is conducted from storage nodes 112-113 to archive nodes 121-123, a copy of the migration data can be placed in buffer cluster 125, which comprises migration data copies A1-A3 stored in archive nodes 121-123. Later, data copies A1-A3 can be encoded with erasure coding ("EC") and stored into independent drives in archive cluster 130. It is common that the original data stored in storage node 111-113 are multiple copies of the same data. As a result, to migrate one copy of data into archive clusters, system 100 of FIG. 1 needs to maintain three copies of the data in the storage nodes, three copies of the data in buffer cluster 125, and three copies of encoded data in archive cluster 130. If more than three copies of data are stored in storage nodes, system 100 may need to maintain additional copies.

Aside from having to maintain a large number of copies of data, existing systems suffer additional limitations. First, moving a large amount of data is simply a very tedious, resource consuming, and time-consuming task. In modern day database systems, it is normal to archive hundreds of terabytes at once, which can take months to complete. While the archiving process is taking place, the ethernet bandwidth between the data centers is constantly being strained, potentially impacting the performance of other tasks on the database system. Moreover, internet bandwidth can be costly to purchase, hence adding additional cost to the migration operation. Second, the buffer cluster (e.g., buffer cluster 125) is generally formed with the conventional magnetic recording ("CMR") hard disk drives ("HDDs"). CMR HDD of the buffer cluster receives simultaneous write operations from multiple users, which is equivalent to random write operations on the CMR HDD. Later, when the data from the buffer cluster is encoded, the CMR HDD is also read out with random addresses for EC. Since both the writing process and the reading process on the CMR HDD comprises random writes and reads, the CMR HDD's input/output operation operations per second ("TOPS") is the throughput is very high, causing a bottleneck for the data migration process. Third, the throughput enhancement of the archival system contributed by the buffer cluster is limited considering the random accesses, but the cost is considerable in terms of the drive expense, the power consumption, and the traffic congestion.

Figure 2:
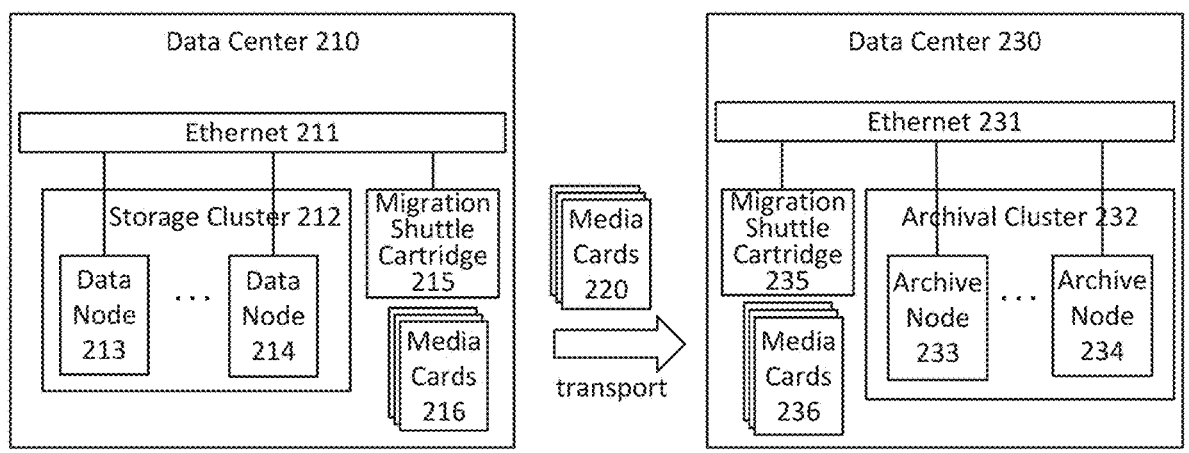
FIG. 2 is an illustration of an example schematic for a data migration system, according to some embodiments of the present disclosure.

Embodiments of the present disclosure provide methods and systems with improved speed and efficiency to mitigate the issues discussed above. FIG. 2 is an illustration of an example schematic for a data migration system, according to some embodiments of the present disclosure. As shown in FIG. 2, migration system 200 comprises data centers 210 and 230. Data center 210 comprises storage cluster 21 and migration cartridge 215, which are communicatively coupled via ethernet 211 of data center 210. Storage cluster 212 comprises data nodes, including data nodes 213 and 214. Data center 210 further comprises one or more media cards 216. Data center 230 comprises archival cluster 232 and migration cartridge 235, which are communicatively coupled via ethernet 231 of data center 230. Storage cluster 232 comprises archive nodes, including archive nodes 233 and 234. Data center 230 further comprises one or more media cards 236. System 200 further comprises one or more media cards 220 in transport between data center 210 and data center 230. In some embodiments, migration cartridge 215 and media cards 216 can be a part of a migration shuttle (not shown on FIG. 2) of data center 210. Similarly, migration cartridge 235 and media cards 236 can be a part of migration shuttle (not shown on FIG. 2) of data center 230.

When data is ready for migration from data center 210 to data center 230, the data can be read out from storage cluster 212. In some embodiments, the data can be read out from data nodes in storage cluster 212, such as data nodes 213 and 214. In some embodiments, when the data is read out, data center 210 can re-organize the data into an archival format.

After the data has been read out from storage cluster 212, the data can be transferred to migration cartridge 215. In some embodiments, the transferring process can be completed via ethernet 211. In some embodiments, ethernet 211 can be a connection that is local to data center 210. The data can then be written into media cards 216 through migration cartridge 215.

In some embodiments, media cards, including media cards 216, 220, and 236, can be high-density NAND flash cards, such as quad-level cell ("QLC") NAND flash cards. High-density NAND flash cards have high capacity and enhanced throughput. In some embodiments, when data is written into the media cards, the media cards can keep sequential access of the data stored in the media cards. Therefore, writing operations on the media cards are different from the writing operations on the HDD, which are randomized. As a result, the write amplification for the writing operations on the media cards approaches to 1, a significant improvement over HDDs or even low-cost NAND cards if QLC NAND flash cards are used.

When data center 210 finishes writing data into media cards 216, media cards 216 are transported to data center 230. Media cards in transport are denoted as media cards 220, which can include media cards 216. In some embodiments, the transport process involves physically transporting media cards 220 from data center 210 to data center 230 with sufficient protection and security. For example, if data center 210 is located in San Francisco, California, and data center 230 is located in Austin, Texas, transporting media cards 220 involves physically moving media cards 220 from San Francisco to Austin, while sufficient protection and security is ensured while media cards 220 are in transport.

In some embodiments, while media cards 220 have been removed from data center 210 and placed in transport, data center 210 can continuously read out data from storage cluster 212 and storing data into other media cards 216. In some embodiments, data stored in storage cluster 212 are read out and transferred in batches.

After media cards 220 are transported to data center 230, media cards 220, including media cards 216, are joined with media cards 236 of data center 230. Media cards 220 can then be accessed by migration cartridge 235 of data center 230. Migration cartridge 235 can transfer the data in the media cards to archival cluster 232. In some embodiments, the transferring of the data can be completed via ethernet 231. In some embodiments, ethernet 231 can be a connection that is local to data center 230. In some embodiments, when data is stored into media cards 216 in data center 210, the data is already re-organized into an archival format. As a result, the data can be directly read out from the media cards and stored into archival cluster 232. In some embodiments, archival cluster 232 comprises HDDs, such as shingled magnetic recording ("SMR") HDDs, and the data can be stored into the HDDs in archival cluster 232. SMR HDDs are similar to the NAND flash cards in the aspect of block-wise write.

Figure 3:
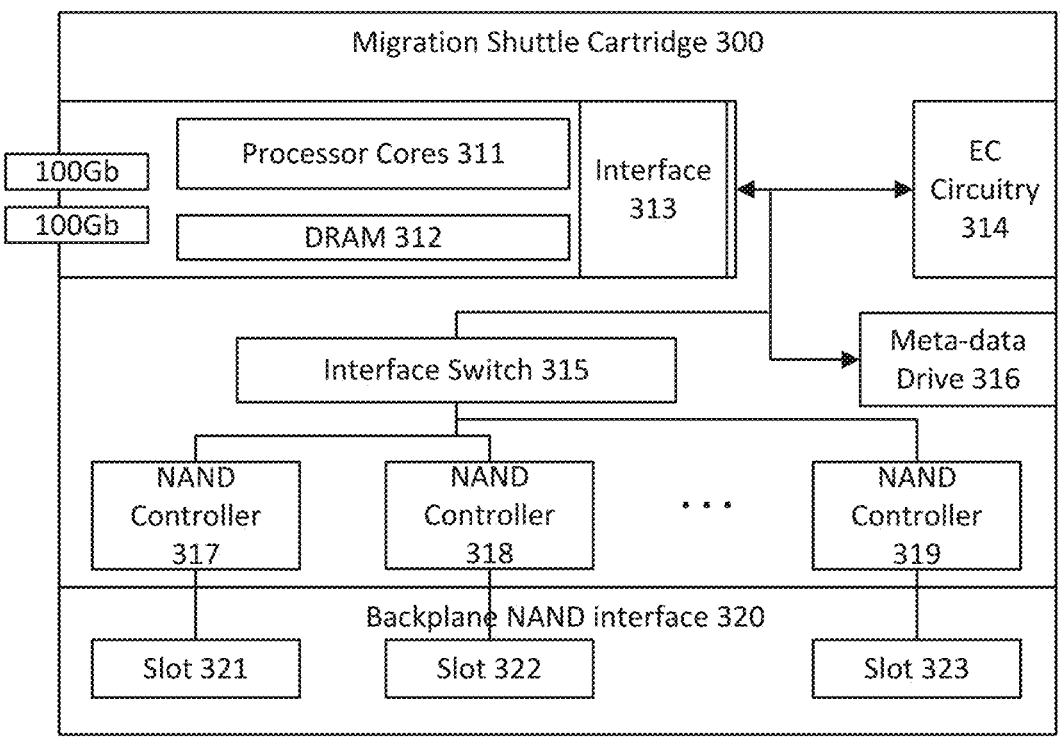
FIG. 3 is an illustration of an example schematic for a migration cartridge, according to some embodiments of the present disclosure.

FIG. 3 is an illustration of an example schematic for a migration cartridge, according to some embodiments of the present disclosure. As shown in FIG. 3, migration cartridge 300 can comprise one or more processor cores 311, DRAM 312, interface 313, erasure coding ("EC") circuitry 314, interface switch 315, meta-data drive 316, NAND controllers 317-319, and backplane NAND interface 320. In some embodiments, migration cartridge 300 can be implemented in migration system 200 shown in FIG. 2 as migration cartridge 216 or migration cartridge 236.

In some embodiments, interface 313 can be a peripheral component internet express ("PCIe"). In some embodiments, interface 313 can provide higher throughput (e.g., 200 Gb). In some embodiments, interface 313 comprises a root complex (e.g., PCIe root complex (not shown)) that branches out to one or more lanes (e.g., PICe lanes) connecting error correction ("EC") circuitry 314, meta-data drive 316, and interface switch 315. Interface switch 315 can further branch out to one or more NAND controllers, such as NAND controllers 317-319. The one or more NAND controllers can be communicatively coupled with one or more slots, such as slots 321-323. The one or more slots can be a part of backplane NAND interface 320, and media cards (e.g., media cards 216, 220 or 236) can be inserted into the one or more slots.

In some embodiments, one or more processor cores 311 can handle network protocol conversions and encryptions. EC circuitry 314 can perform encodings of EC that is needed by the archival storage. For example, the encoding of EC can provide redundant data pieces to be stored across different storage locations, so that data is better protected against accidental losses or access failures. In some embodiments, EC circuitry 314 can be a hardware implementation or a hardware accelerator, such as a field programmable gate array ("FPGA") or an application-specific integrated circuit ("ASIC").

In some embodiments, when data is stored into media cards via migration cartridge 300, data is first transferred into migration cartridge 300 via interface 313. One or more processor cores 311 can handle network protocol conversions and encryptions for the data. EC circuitry 314 can provide EC encodings on the data. After the EC encoding process, the data can be transferred and stored into media cards via interface switch 315, NAND controllers 317-319, and slots 321-323. It is appreciated that the data may be stored in multiple media cards.

In some embodiments, when data is read out from media cards via migration cartridge 300, data is first read out and transferred to interface 313 via slots 321-323, NAND controllers 317-319, and interface switch 315. One or more processor cores 311 can handle network protocol conversions and encryptions for the data before the data is transferred out of migration cartridge 300.

Figure 4:
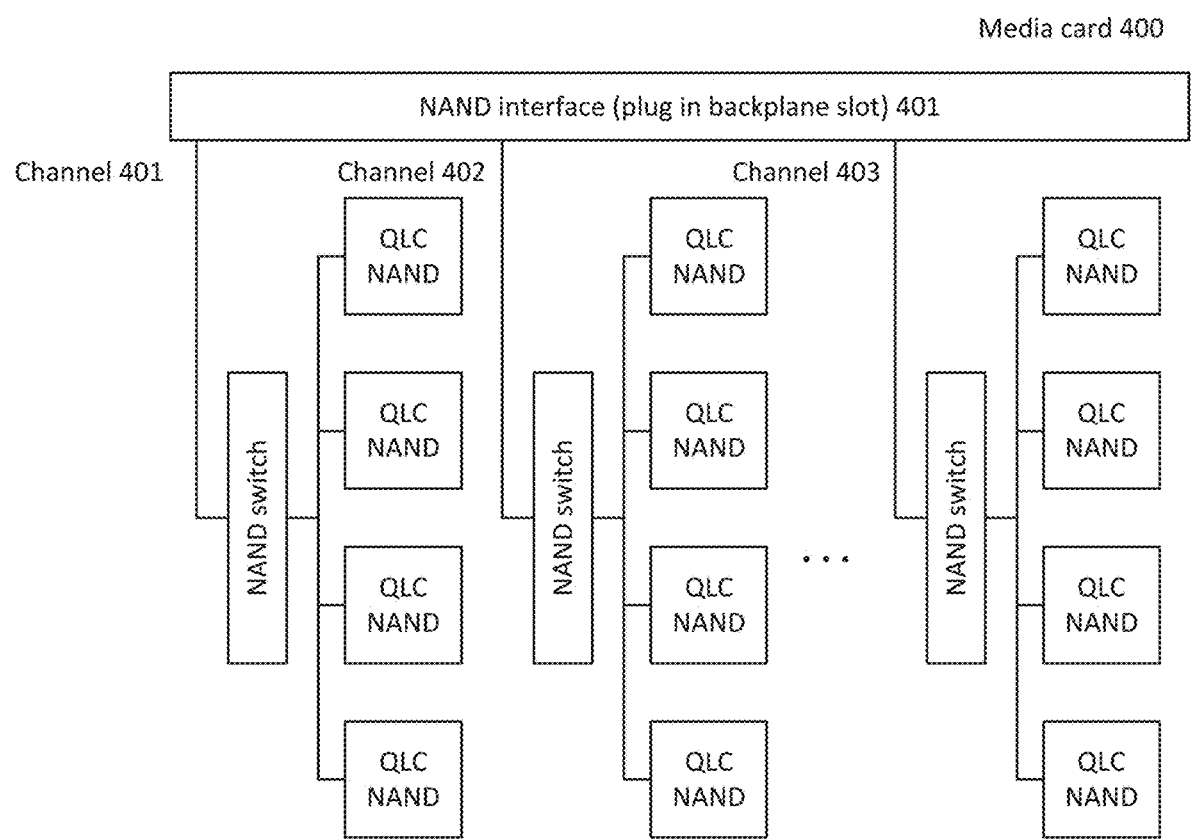
FIG. 4 is an illustration of an example schematic for a media card, according to some embodiments of the present disclosure.

FIG. 4 is an illustration of an example schematic for a media card, according to some embodiments of the present disclosure. It is appreciated that media card 400 shown in FIG. 4 can be used as media cards 216, 220, or 236 of FIG. 2. As shown in FIG. 4, media card 400 comprises NAND interface 401. In some embodiments, NAND interface 401 can be plugged into or removed from backplane network interface in a migration cartridge, such as backplane NAND interface 320 of FIG. 3. NAND interface 401 can fan out multiple channels, such as channels 401-403. In some embodiments, each of the multiple channels can comprise a NAND switch, which can fan out to multiple NAND dies. In some embodiments, the NAND dies are QLC NAND dies. In some embodiments, each of the NAND dies can comprise one or more NAND blocks. The NAND switches can further increase the capacity of media card 400. Moreover, although the NAND switches may add to overall latency in transferring data into and out of NAND blocks, the throughput of the sequential write can still meet the system requirement. Furthermore, since reading and writing operations on media card 400 is sequential, there is no over-provisioning required, with the exception of a few free NAND blocks in each die for bad block replacement.

Figure 5:
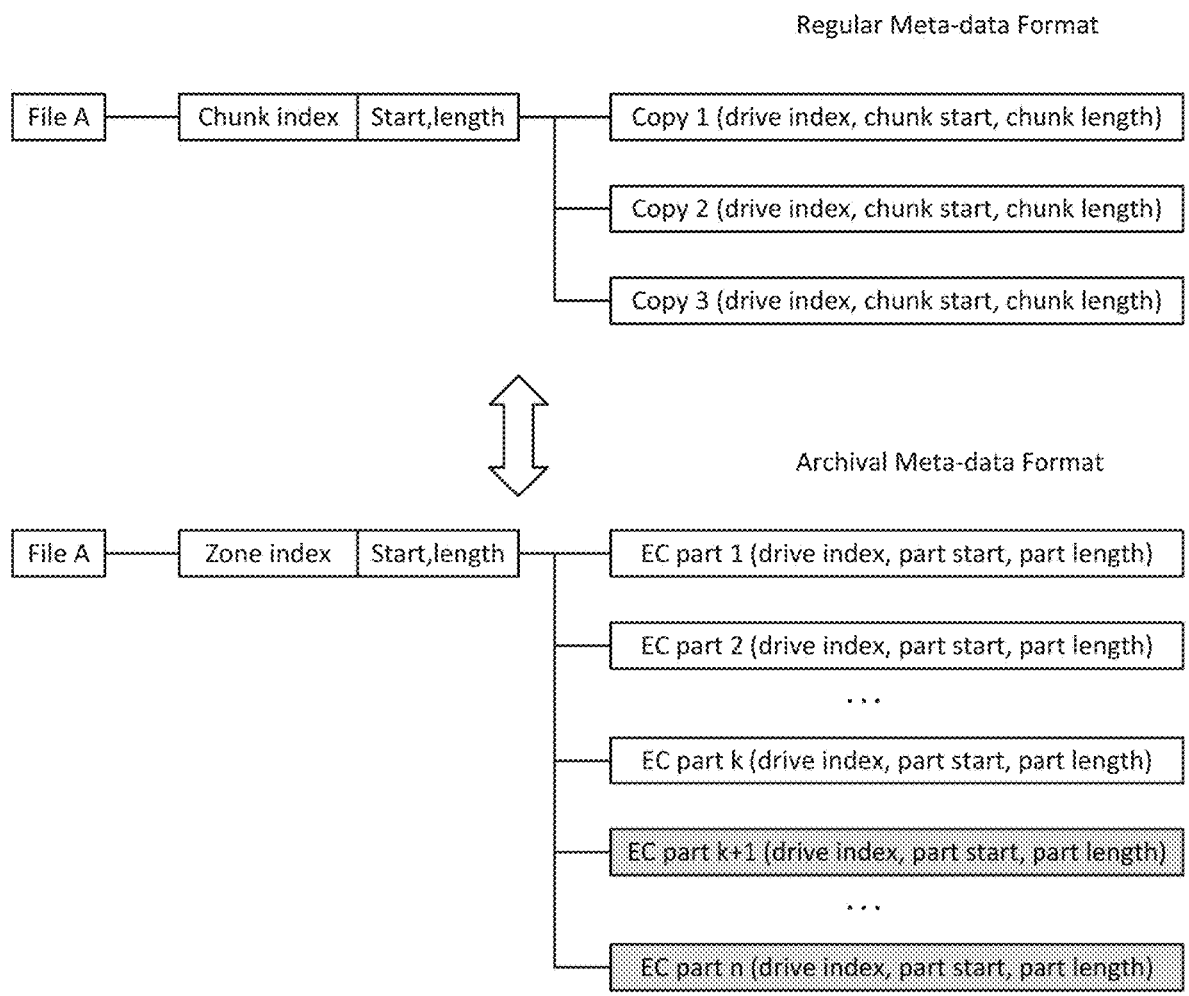
FIG. 5 is an illustration of an example process for conversions of data formats in a migration system, according to some embodiments of the present disclosure.

FIG. 5 is an illustration of an example process for conversions of data formats in a migration system, according to some embodiments of the present disclosure. As shown in FIG. 5, the migration system can include two meta-data formats, namely regular meta-data format and archival meta-data format. It is appreciated that the regular meta-data format and the archival meta-data format can be used by data migration system 200 of FIG. 2 or migration cartridge 300 of FIG. 3.

As shown in FIG. 5, with the existing data in the storage cluster and the placement rule in the archival system, data's location in the media cards and the SMR HDDs can be derived. As a result, instead of generating data placement while data is in the process of being stored into SMR HDD, placement can be planned ahead in another data center (e.g., data center 210 of FIG. 2) using fixed rules that are inherent in the storage cluster (e.g., storage cluster 212 of FIG. 2) and the archival cluster (e.g., archival cluster 232 of FIG. 2). For example, as shown in FIG. 5, the meta-data for file A comprises file A's data chunk index, start location, and file length. Using file A's data chunk index and start location, the beginning of file A can be located in the storage cluster by finding the chunk with the chunk index and using the start location to count from the beginning of this chunk. Then, file A can be obtained from the storage cluster by reading the exact length of data according to file A's file length. In some embodiments, the actual data reading operation does not take place at this meta-data conversion stage. This conversion stage analyzes the meta-data of the storage cluster to generate the archival meta-data that is stored in a drive of the migration cartridge (e.g., meta-data drive 316 of FIG. 4). Then, based on the meta-data, the data from the storage cluster can be located and read out into the migration cartridge.

In some embodiments, there can be multiple copies of the same data in the storage cluster. For example, as shown in FIG. 5, file A has three copies. Since each copy may be stored in different drives or locations in the storage cluster, the meta-data for each copy can also include location information for the drives, such as drive indices. In some embodiments, for data that has multiple copies, data can be transferred concurrently from different copies. For example, as shown in FIG. 5, file A has three copies. As a result, the first ⅓ of the data can be transferred from the first copy the second ⅓ of the data can be transferred from the second copy, and the third ⅓ of the data can be transferred from the third copy. Therefore, if all three copies can be transferred concurrently, the database system has a potential to reduce the transfer time by as much as ⅔.

After meta-data from regular the meta-data format is converted to an archival meta-data format, the archival meta-data format can comprise one or more parts with EC encoding. In some embodiments, the archival meta-data format comprises information for error correction code ("ECC") parity of the data in archival format. For example, as shown in FIG. 5, the meta-data in the archival meta-data format comprises multiple parts, with each part comprising information denoting to the location of the data in a corresponding archival cluster (e.g., archival cluster 232 of FIG. 2), such as drive index, part start, and part length. Some parts of the meta-data in the archival format (e.g., parts highlighted in color grey on FIG. 5) can be denoted to the parity of ECC.

Figure 6:
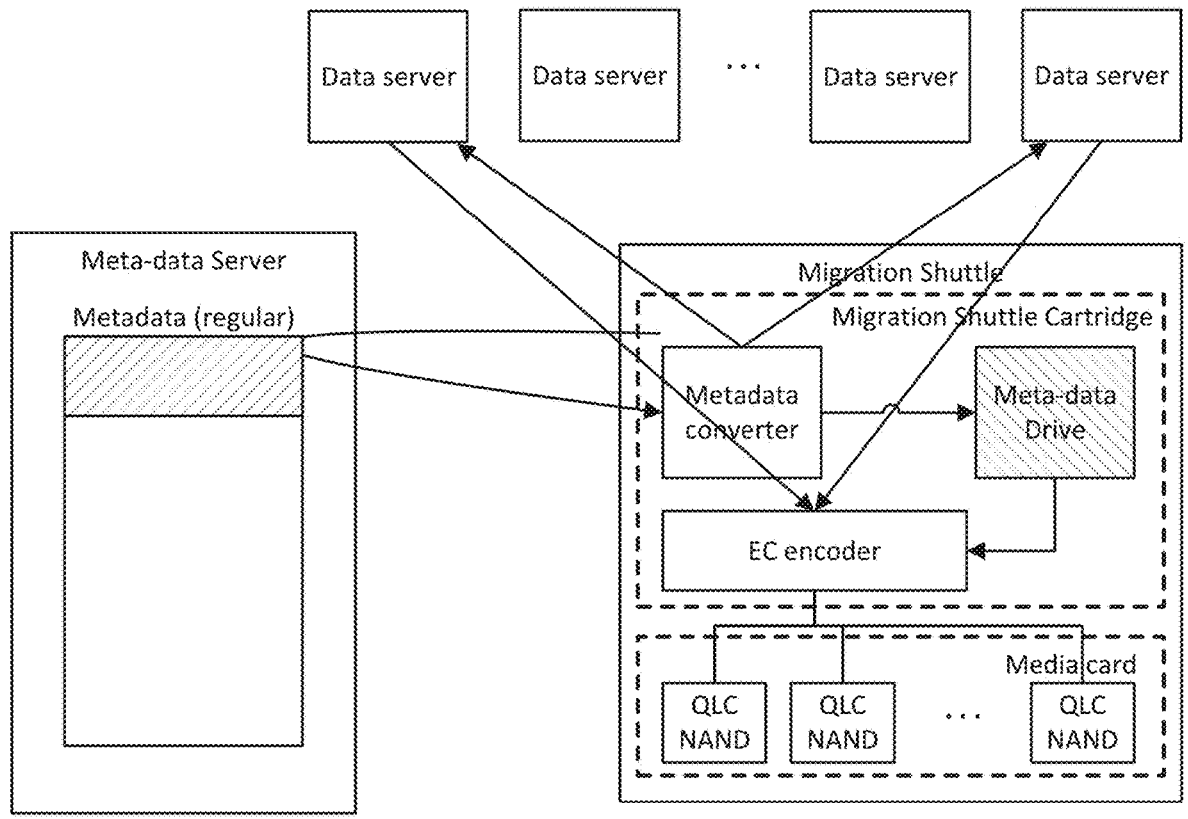
FIG. 6 is an illustration of an example process for copying data from a storage cluster to media cards, according to some embodiments of the present disclosure.

FIG. 6 is an illustration of an example process for copying data from a storage cluster to media cards, according to some embodiments of the present disclosure. It is appreciated that the data center shown in FIG. 6 can be similar to data center 210 of FIG. 2, the data servers shown in FIG. 6 can be similar to data nodes 213-214 of FIG. 2, the migration cartridge shown in FIG. 6 can be similar to migration cartridge 215 of FIG. 2 or migration cartridge 300 of FIG. 3, and the media card shown in FIG. 6 can be similar to media cards 216 shown in FIG. 2.

As shown in FIG. 6, when data is ready to be transferred from the data servers to the media card, the migration shuttle can fetch meta-data from the meta-data server. In some embodiments, the migration shuttle can fetch meta-data from the meta-data server via a meta-data converter. The meta-data converter can convert meta-data into archival meta-data format, similar to the conversion operation shown in FIG. 5. In some embodiments, the meta-data server can be a part of the storage cluster. In some embodiments, a batch of the media card's capacity can be lower than the capacity of the storage cluster. As a result, only one batch of meta-data (e.g., shown in grey on FIG. 6) may be converted and stored in the meta-data drive (e.g., meta-data drive 316 of FIG. 3) at once. In case of accidents (e.g., power loss), the data migration can continue from a last break point by reading the meta-data drive of the migration cartridge.

As shown in FIG. 6, when meta-data is fetched from meta-data server, the migration cartridge can get data to be migrated from the data servers. The migration cartridge can also encode and partition the data and store the data into multiple NAND regions in the media card. The encoding process can include ECC. In some embodiments, each NAND region can correspond to one SMR HDD in archival cluster. When the media card is getting full, the archival meta-data for the data in the current batch can be flushed into the media card from the meta-data drive in the migration cartridge.

Figure 7:
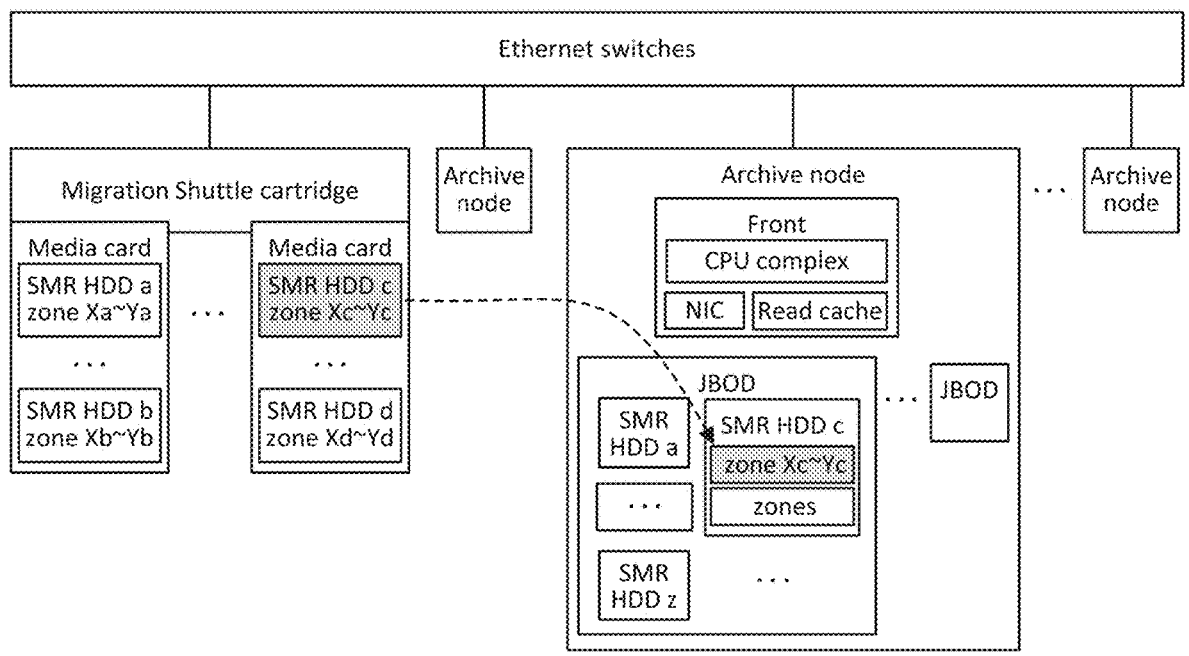
FIG. 7 is an illustration of an example process for moving data from media cards to archive nodes, according to some embodiments of the present disclosure.

FIG. 7 is an illustration of an example process for moving data from media cards to archive nodes, according to some embodiments of the present disclosure. It is appreciated that the data center shown in FIG. 7 can be similar to data center 230 of FIG. 2, archive nodes shown in FIG. 7 can be similar to archive nodes 233-234 of FIG. 2, the migration cartridge shown in FIG. 7 can be similar to migration cartridge 235 of FIG. 2 or migration cartridge 300 of FIG. 3, and media card shown in FIG. 7 can be similar to media cards 236 shown in FIG. 2.

As shown in FIG. 7, the transported media cards can be plugged into the migration cartridge. Then, data stored in the media cards can be transferred to the archive nodes. In some embodiments, the data stored in the media cards can be transferred to the archive nodes via the ethernet switches. In some embodiments, channels in the media cards can work in parallel, and data stored in different channels can be transferred concurrently to speed up the transferring process.

In some embodiments, data stored in the media cards have already been converted into an archival format. As shown in FIG. 7, data stored in the media cards are organized according to zones (e.g., NAND regions), and each zone correspond to a zone in the SMR HDD in the archive node. For example, as shown in FIG. 7, data stored in zone Xc-Yc in the media card can be transferred to zone Xc-Yc in the archive node. Therefore, when data is transferred, data in each zone can be directly transferred into the corresponding zone in the SMR HDD of the archive node. As a result, the read operations from the media cards and the write operations into the SMR HDD in the archive node can be both sequential to utilize the hardware bandwidth. In some embodiments, a zone in the media cards can comprise one or more NAND blocks.

In some embodiments, the meta-data stored in the media cards can be transferred into the archive nodes too. In some embodiments, the archive cluster may have many archive nodes, and each archive node can comprise one or more JBODs (acronym for "Just a Bunch of Disks"). In some embodiments, after the data have been transferred into the archive nodes, the media cards can be erased and sent back to the source data center to load new batches of data.

Figure 8:
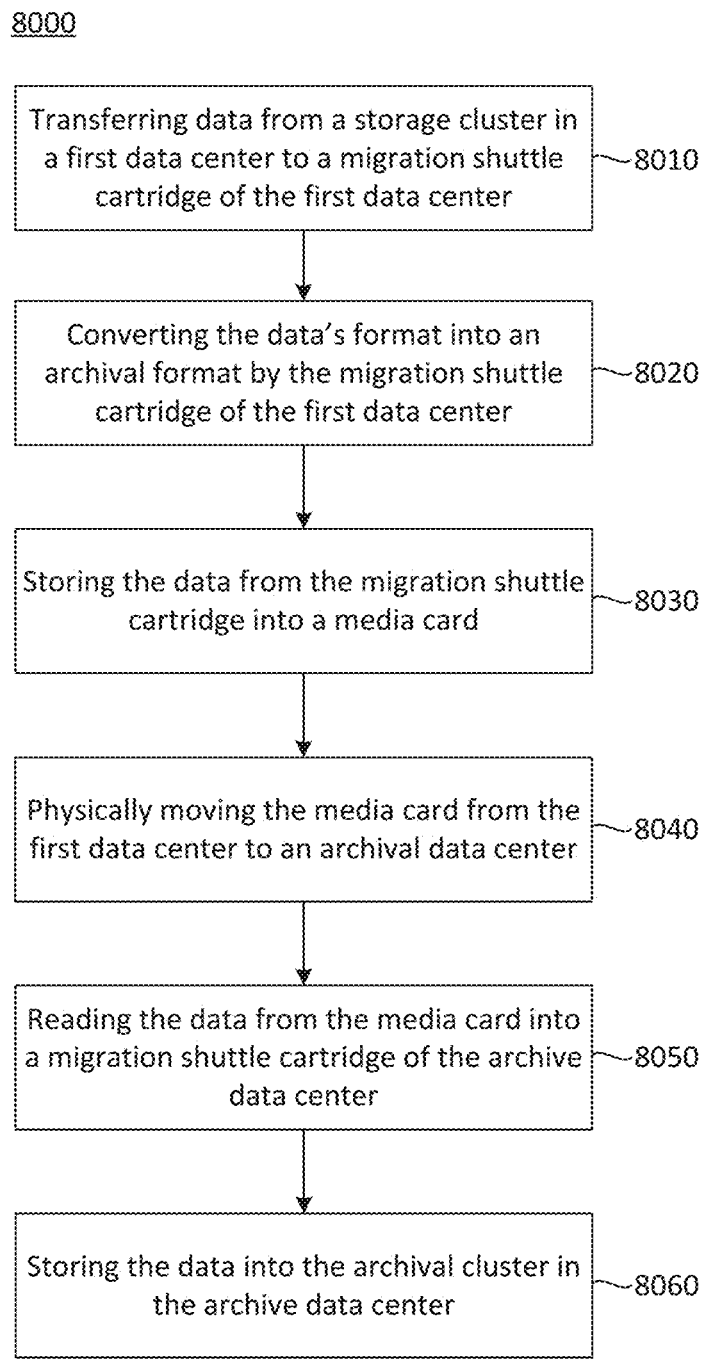
FIG. 8 is an illustration of an example method for migrating data from a data center to an archive data center, according to some embodiments of the present disclosure.

Embodiments of the present disclosure further provide a method for migrating data from a data center to an archive data center. FIG. 8 is an illustration of an example method for migrating data from a data center to an archive data center, according to some embodiments of the present disclosure. It is appreciated that method 8000 of FIG. 8 can be executed on migration system 200 of FIG. 2.

In step 8010, data is transferred from a storage cluster in the first data center to a migration cartridge of the first data center. In some embodiments, the first data center is similar to data center 210 of FIG. 2, the storage cluster is similar to storage cluster 212 of FIG. 2, and the migration cartridge is similar to migration cartridge 215 of FIG. 2 or migration cartridge 300 of FIG. 3. In some embodiments, there are multiple copies of the data stored in the storage cluster, and the transferring operation can further comprise transferring the data from the multiple copies in parallel, reducing the transferring time, similar to file A shown in FIG. 5.

In some embodiments, before the data is transferred from the storage cluster, meta-data corresponding to the data can be retrieved from a meta-data server, similar to the meta-data server of FIG. 6. The meta-data can comprise location information of the copies of the data in the data clusters. As a result, the data can be located and transferred from the data cluster according to the meta-data.

Referring back to FIG. 8, in step 8020, the data's format is converted into an archival format by the migration cartridge of the first data center. In some embodiments, the archival format includes dividing data into multiple parts, while each part corresponds to a zone in an archival cluster. In some embodiments, the converting operation includes encoding the data with EC. In some embodiments, the converting operation also includes encoding the data with ECC parity, similar to file A shown in FIG. 5. In some embodiments, when the data's format is converted into an archival format, the meta-data's format is also converted into an archival format, similar to file A's meta-data shown in FIG. 5.

In step 8030, the data is stored from the migration cartridge into a media card. In some embodiments, the data is stored into NAND regions of the media card according to the archival format of the data and the meta-data. For example, as shown in FIG. 6, data is stored into multiple NAND regions in the media card, and each NAND region can correspond to one SMR HDD in the archival cluster.

In step 8040, the media card is physically moved from the first data center to the archive data center. In some embodiments, sufficient protection and security is ensured while the media card is in transport.

In step 8050, the data in the media card is read into a migration cartridge of the archive data center. In some embodiments, the data stored in the media card can be read sequentially, hence largely reducing the overhead associated with random reading operations. In some embodiments, data in a plurality of NAND regions can be read in parallel, hence reducing the time for conducting the reading operation.

In step 8060, the data is stored into the archival cluster in the archive data center according to the archival format of the data. In some embodiments, the data stored in a NAND region corresponds to an SMR HDD or a zone in the archival cluster. As a result, the data stored in a NAND region can be stored in the corresponding SMR HDD or the corresponding zone in the archival cluster.

It is appreciated that embodiments of the present disclosure are not limited to systems and methods that includes data centers. The data migration systems and methods described above can be applied to any data environments. For example, the data migration systems and methods can be applied to edge computing clusters, or any data environments where data migration is conducted.

The systems and methods described in the embodiments of the present disclosure can provide many advantages over existing systems. First, when data is transferred from one data center to another, the data is stored in media cards being transported, Therefore, the transferring process no longer takes valuable internet bandwidth, especially for data centers that are located apart from each other. Second, when the data is transferred from storage clusters into the media cards, the writing operations can be sequential as opposed to random writing operations, hence reducing the writing overhead. Third, the need to use CMR HDD as buffer clusters can be minimized or eliminated from the data transferring operation, hence eliminating any physical cost or operation cost associated with using and maintaining CMR HDDs in the buffer clusters. Fourth, after the data has been transferred from the storage cluster into the media cards, the migration system can delete or overwrite the data in the storage cluster right away. The migration system no longer needs to keep the original copy or copies of the data in the storage cluster. Fifth, when the data is transferred from the media cards into the archival clusters, the format of the data is already in archival format. Therefore, the transferring process can be a sequential read operation on the media card, reducing the overhead associated with random reads associated with CMR HDDs.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, SSD, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The host system, operating system, file system, and other functional units described in this disclosure can be implemented by hardware, or software, or a combination of hardware and software. One of ordinary skill in the art will also understand that multiple ones of the above described functional units may be combined as one functional unit, and each of the above described functional units may be further divided into a plurality of functional sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The embodiments may further be described using the following clauses:

1. A method for data migration, comprising:
   transferring data from a storage cluster to a first migration cartridge;
   converting, by the first migration cartridge, the data's format into an archival format; and
   storing the converted data into a media card, wherein the converted data is read from the media card into a second migration cartridge and stored into an archival cluster according to the archival format of the data.

2. The method of clause 1, wherein converting the data's format into an archival format in the first migration cartridge further comprises:
   encoding the data with error correction code.

3. The method of clause 1 or 2, wherein transferring data from a storage cluster to a first migration cartridge further comprises:
   receiving, by the first migration cartridge, meta-data corresponding to the data from a meta-data server;
   locating the data in the storage cluster according to the meta-data; and
   transferring the data from the storage cluster to the first migration cartridge according to the location of the data in the storage cluster.

4. The method of clause 3, further comprising:
   converting the meta-data's format into an archival meta-data format, wherein the archival meta-data format includes meta-data for error correction code parity;
   storing the meta-data into a meta-data drive in the first migration cartridge; and
   storing the meta-data in the archival meta-data format into the media card.

5. The method of any one of clauses 1-4, wherein transferring data from a storage cluster to a first migration cartridge further comprises:
   transferring the data from multiple copies of the data stored in the storage cluster in parallel.

6. The method of any one of clauses 1-5, further comprising:
   moving the media card from the first migration cartridge to the second migration cartridge, wherein while the media card is moved from the first migration cartridge to the second migration cartridge, the data stored in the storage is deleted or overwritten.

7. The method of any one of clauses 1-6, wherein:
   converting the data's format into an archival format in the first migration cartridge further comprises:
      dividing the data into multiple parts;
   storing the data into a media card further comprises:
      storing each of the multiple parts of the data into a NAND region of multiple NAND regions on the media card, wherein each of the multiple NAND regions on the media card correspond to a zone in the archival cluster; and
   when the data is stored into the archival cluster according to the archival format of the data, the data is stored in each of the multiple NAND regions into a corresponding zone in the archival cluster.

8. The method of clause 7, wherein the media card comprises one or more NAND switches that fan out to multiple NAND regions.

9. A non-transitory computer readable medium that stores a set of instructions that is executable by at least one processor of a computer system to cause the computer system to perform a method, the method comprising:
   transferring data from a storage cluster to a first migration cartridge;
   converting, by the first migration cartridge, the data's format into an archival format; and
   storing the data into a media card, wherein the data is read from the media card into a second migration cartridge and stored into an archival cluster according to the archival format of the data.

10. The non-transitory computer readable medium of clause 9, wherein the set of instructions is executable by the at least one processor of the computer system to cause the computer system to further perform:
    encoding the data with error correction code.

11. The non-transitory computer readable medium of clause 9 or 10, wherein the set of instructions is executable by the at least one processor of the computer system to cause the computer system to further perform:
    receiving, by the first migration cartridge, meta-data corresponding to the data from a meta-data server;
    locating the data in the storage cluster according to the meta-data; and
    transferring the data from the storage cluster to the first migration cartridge according to the location of the data in the storage cluster.

12. The non-transitory computer readable medium of clause 11, wherein the set of instructions is executable by the at least one processor of the computer system to cause the computer system to further perform:
    converting the meta-data's format into an archival meta-data format, wherein the archival meta-data format includes meta-data for error correction code parity;

storing the meta-data into a meta-data drive in the first migration cartridge; and storing the meta-data in the archival meta-data format into the media card.

13. The non-transitory computer readable medium of any one of clauses 9-12, wherein while the media card is moved from the first migration cartridge to the second migration cartridge, the data stored in the storage cluster is deleted or overwritten.

14. The non-transitory computer readable medium of any one of clauses 9-13, wherein the set of instructions is executable by the at least one processor of the computer system to cause the computer system to further perform:

dividing the data into multiple parts; and storing each of the multiple parts of the data into a NAND region of multiple NAND regions on the media card, wherein:

each of the multiple NAND regions on the media card correspond to a zone in the archival cluster, and when the data is stored into the archival cluster according to the archival format of the data, the data is stored in each of the multiple NAND regions into a corresponding zone in the archival cluster.

15. A system for data migration, comprising:

a storage cluster;

a first migration cartridge communicatively coupled to the storage cluster, wherein the first migration cartridge comprises one or more slots for inserting media cards;

a memory storing a set of instructions; and one or more processors configured to execute the set of instructions to cause the system to perform:

transferring data from the storage cluster to the first migration cartridge;

converting, by the first migration cartridge, the data's format into an archival format; and storing the data into a media card, wherein the data is read from the media card into a second migration cartridge and stored into an archival cluster according to the archival format of the data.

16. The system of clause 15, wherein the one or more processors are further configured to execute the set of instructions to cause the system to perform:

encoding the data with error correction code.

17. The system of clause 15 or 16, wherein the one or more processors are further configured to execute the set of instructions to cause the system to perform:

receiving, by the first migration cartridge, meta-data corresponding to the data from a meta-data server;

locating the data in the storage cluster according to the meta-data; and transferring the data from the storage cluster to the first migration cartridge according to the location of the data in the storage cluster.

18. The system of clause 17, wherein the one or more processors are further configured to execute the set of instructions to cause the system to perform:

converting the meta-data's format into an archival meta-data format, wherein the archival meta-data format includes meta-data for error correction code parity;

storing the meta-data into a meta-data drive in the first migration cartridge; and storing the meta-data in the archival meta-data format into the media card.

19. The system of any one of clauses 15-18, wherein while the media card is moved from the first migration cartridge to the second migration cartridge, the data stored in the storage cluster is deleted or overwritten.

20. The system of any one of clauses 15-19, wherein the one or more processors are further configured to execute the set of instructions to cause the system to perform:

dividing the data into multiple parts; and storing each of the multiple parts of the data into a NAND region of multiple NAND regions on the media card, wherein:

each of the multiple NAND regions on the media card correspond to a zone in the archival cluster, and when the data is stored into the archival cluster according to the archival format of the data, the data is stored in each of the multiple NAND regions into a corresponding zone in the archival cluster.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for data migration, comprising:

transferring data from a storage cluster to a first migration cartridge;

converting, by the first migration cartridge, the data from a storage format used by the storage cluster into an archival format used by an archival cluster according to meta-data corresponding to the data, and converting the meta-data's format into an archival meta-data format, wherein the archival format is different than the storage format, wherein the converted data is stored on a NAND region corresponding to a zone in the archival cluster according to the archival format, and wherein the converted data is divided into multiple parts; and storing the converted data and the meta-data in the archival meta-data format into a media card, wherein the converted data in the archival format is read sequentially from the media card into a second migration cartridge and stored sequentially into the archival cluster in the archival format directly, comprises:

storing each of the multiple parts of the converted data into respective NAND region of multiple NAND regions on the media card, wherein each of the multiple NAND regions on the media card correspond to a respective zone in the archival cluster; and in response to the converted data being stored into the archival cluster in the archival format, the converted data is stored from each of the multiple NAND regions into the respective zone in the archival cluster according to the meta-data in the archival meta-data format.

2. The method of claim 1, wherein converting the data's format into the archival format in the first migration cartridge further comprises:

encoding the converted data with an error correction code.

3. The method of claim 1, wherein transferring data from the storage cluster to the first migration cartridge further comprises:

receiving, by the first migration cartridge, the meta-data corresponding to the data from a meta-data server;

locating the data in the storage cluster according to the meta-data; and transferring the data from the storage cluster to the first migration cartridge according to the location of the data in the storage cluster.

4. The method of claim 3, wherein the archival meta-data format includes meta-data for error correction code parity, the method further comprising:

storing the meta-data into a meta-data drive in the first migration cartridge; and storing the meta-data in the archival meta-data format into the media card.

5. The method of claim 1, wherein transferring data from the storage cluster to the first migration cartridge further comprises:

transferring the data from multiple copies of the data stored in the storage cluster in parallel.

6. The method of claim 1, further comprising:

moving the media card from the first migration cartridge to the second migration cartridge, wherein while the media card is moved from the first migration cartridge to the second migration cartridge, the data stored in the storage cluster is deleted or overwritten.

7. The method of claim 1, wherein the media card comprises one or more NAND switches that fan out to multiple NAND regions.

8. A non-transitory computer readable medium that stores a set of instructions that is executable by at least one processor of a computer system to cause the computer system to perform a method, the method comprising:

transferring data from a storage cluster to a first migration cartridge;

converting, by the first migration cartridge, the data from a storage format used by the storage cluster into an archival format used by an archival cluster according to meta-data corresponding to the data, and converting the meta-data's format into an archival meta-data format, wherein the archival format is different than the storage format, wherein the converted data is stored on a NAND region corresponding to a zone in the archival cluster according to the archival format, and wherein the converted data is divided into multiple parts; and storing the converted data and the meta-data in the archival meta-data format into a media card, wherein the converted data in the archival format is read sequentially from the media card into a second migration cartridge and stored sequentially into the archival cluster in the archival format directly, comprises:

storing each of the multiple parts of the converted data into respective NAND region of multiple NAND regions on the media card, wherein:

each of the multiple NAND regions on the media card correspond to a respective zone in the archival cluster, and in response to the converted data being stored into the archival cluster in the archival format, the converted data is stored from each of the multiple NAND regions into the respective zone in the archival cluster according to the meta-data in the archival meta-data format.

9. The non-transitory computer readable medium of claim 8, wherein the set of instructions is executable by the at least one processor of the computer system to cause the computer system to further perform:

encoding the converted data with an error correction code.

10. The non-transitory computer readable medium of claim 8, wherein the set of instructions is executable by the at least one processor of the computer system to cause the computer system to further perform:

receiving, by the first migration cartridge, the meta-data corresponding to the data from a meta-data server;

locating the data in the storage cluster according to the meta-data; and transferring the data from the storage cluster to the first migration cartridge according to the location of the data in the storage cluster.

11. The non-transitory computer readable medium of claim 10, wherein the archival meta-data format includes meta-data for error correction code parity, and the set of instructions is executable by the at least one processor of the computer system to cause the computer system to further perform:

storing the meta-data into a meta-data drive in the first migration cartridge; and storing the meta-data in the archival meta-data format into the media card.

12. The non-transitory computer readable medium of claim 8, wherein while the media card is moved from the first migration cartridge to the second migration cartridge, the data stored in the storage cluster is deleted or overwritten.

13. A system for data migration, comprising:

a storage cluster;

a first migration cartridge communicatively coupled to the storage cluster, wherein the first migration cartridge comprises one or more slots for inserting media cards;

a memory storing a set of instructions; and one or more processors configured to execute the set of instructions to cause the system to perform:

transferring data from the storage cluster to the first migration cartridge;

converting, by the first migration cartridge, the data from a storage format used by the storage cluster into an archival format used by an archival cluster according to meta-data corresponding to the data, and converting the meta-data's format into an archival meta-data format, wherein the archival format is different than the storage format, wherein the converted data is stored on a NAND region corresponding to a zone in the archival cluster according to the archival format, and wherein the converted data is divided into multiple parts; and storing the converted data and the meta-data in the archival meta-data format into a media card, wherein the converted data in the archival format is read sequentially from the media card into a second migration cartridge and stored sequentially into the archival cluster in the archival format directly, comprises:

storing each of the multiple parts of the converted data into respective NAND region of multiple NAND regions on the media card, wherein:

each of the multiple NAND regions on the media card correspond to a respective zone in the archival cluster, and in response to the converted data being stored into the archival cluster in the archival format, the converted data is stored from each of the multiple NAND regions into respective zone in the archival cluster according to the meta-data in the archival meta-data format.

14. The system of claim 13, wherein the one or more processors are further configured to execute the set of instructions to cause the system to perform:

encoding the converted data with an error correction code.

15. The system of claim 13, wherein the one or more processors are further configured to execute the set of instructions to cause the system to perform:

receiving, by the first migration cartridge, the meta-data corresponding to the data from a meta-data server;

locating the data in the storage cluster according to the meta-data; and transferring the data from the storage cluster to the first migration cartridge according to the location of the data in the storage cluster.

16. The system of claim 15, wherein the archival meta-data format includes meta-data for error correction code parity, and the one or more processors are further configured to execute the set of instructions to cause the system to perform:

storing the meta-data into a meta-data drive in the first migration cartridge; and storing the meta-data in the archival meta-data format into the media card.

17. The system of claim 13, wherein while the media card is moved from the first migration cartridge to the second migration cartridge, the data stored in the storage cluster is deleted or overwritten.

\* \* \* \* \*